(12) United States Patent
Corey et al.

(10) Patent No.: US 7,159,915 B2
(45) Date of Patent: Jan. 9, 2007

(54) ERGONOMICALLY DESIGNED MAIL TRANSPORT AND DELIVERY VEHICLE

(75) Inventors: Wayne Corey, Chantilly, VA (US); Bradley J. Suchy, Germantown, MD (US); Han T. Dinh, Falls Church, VA (US); Jacqueline R. Johnson, Alexandria, VA (US); Jacquelynn Estes, Warrenton, VA (US); Gail A. Murphy, Vienna, VA (US); Aaron M. Mooney, Sterling, VA (US)

(73) Assignee: United States Postal Service, Washington, DC (US)

( * ) Notice: Subject to any disclaimer, the term of this patent is extended or adjusted under 35 U.S.C. 154(b) by 246 days.

(21) Appl. No.: 10/952,845

(22) Filed: Sep. 30, 2004

(65) Prior Publication Data

US 2005/0263337 A1 Dec. 1, 2005

Related U.S. Application Data

(60) Provisional application No. 60/550,260, filed on Mar. 5, 2004.

(51) Int. Cl.
*B60P 3/00* (2006.01)

(52) U.S. Cl. ............ 296/24.3; 296/24.43; 296/24.44; 296/182.1; 296/190.01; 296/64; 296/155; 296/146.15

(58) Field of Classification Search ............ 296/24.3, 296/24.43, 24.44, 182.1, 190.01, 37.8, 64, 296/155, 146.15; 180/89.1, 318
See application file for complete search history.

(56) References Cited

U.S. PATENT DOCUMENTS

| | | | | |
|---|---|---|---|---|
| 1,649,630 A | | 11/1927 | Ward | |
| 1,786,990 A | * | 12/1930 | William | 296/64 |
| 1,804,033 A | * | 5/1931 | Siggins et al. | 296/64 |
| 2,205,723 A | | 6/1940 | Hansen | |
| 2,233,323 A | | 2/1941 | Nicol | |
| 2,318,751 A | | 5/1943 | Carlson | |
| 2,480,047 A | * | 8/1949 | Reinhard | 180/12 |
| 2,634,816 A | | 4/1953 | Martin | |
| 2,700,411 A | | 1/1955 | Lamb | |
| 2,767,896 A | * | 10/1956 | Beck | 224/541 |
| 3,944,277 A | * | 3/1976 | Cyphert | 296/68 |
| 4,082,344 A | | 4/1978 | Anderson | |
| 5,033,567 A | | 7/1991 | Washburn | |

(Continued)

FOREIGN PATENT DOCUMENTS

CA       2351995 A1 * 1/2003

(Continued)

*Primary Examiner*—Jason S. Morrow
(74) *Attorney, Agent, or Firm*—Finnegan, Henderson, Farabow, Garrett & Dunner, L.L.P.

(57) ABSTRACT

A motor vehicle for transporting and delivering mail having vehicle controls (steering, brakes and throttle) that interface with the operator be able to be adjustably located in a position that is comfortable to the operator. The operator seat is of a size and shape that it is comfortable to the $5^{th}$ percentile female through the $95^{th}$ percentile male. The operator seat is also adjustable and the brake and throttle are adjustable with respect to the operator seat. Moreover, the seat is pivotable from a driving configuration facing ahead of the vehicle to a laterally facing position where mail operations can be comfortably conducted from the drivers seat. In addition, the door into the cargo compartment includes a window that lines up with a window in the left side of the cargo compartment such that visibility to the left of the vehicle is enhanced.

20 Claims, 8 Drawing Sheets

U.S. PATENT DOCUMENTS

| | | |
|---|---|---|
| 5,131,714 A | 7/1992 | Evans, Sr. et al. |
| 5,357,143 A * | 10/1994 | Lehr et al. ................. 307/10.1 |
| 5,387,064 A * | 2/1995 | Cardinal ..................... 410/89 |
| 5,687,669 A | 11/1997 | Engler |
| 6,523,879 B1 | 2/2003 | Mizuta |
| 6,772,851 B1 | 8/2004 | Dill |
| 6,786,291 B1 | 9/2004 | Linden et al. |
| 2006/0087154 A1 * | 4/2006 | Schlafer et al. ........ 296/190.01 |

FOREIGN PATENT DOCUMENTS

| | | | |
|---|---|---|---|
| DE | 4314092 A1 * | 1/1994 | .............. 296/182.1 |
| DE | 29610524 U1 * | 9/1996 | |

* cited by examiner

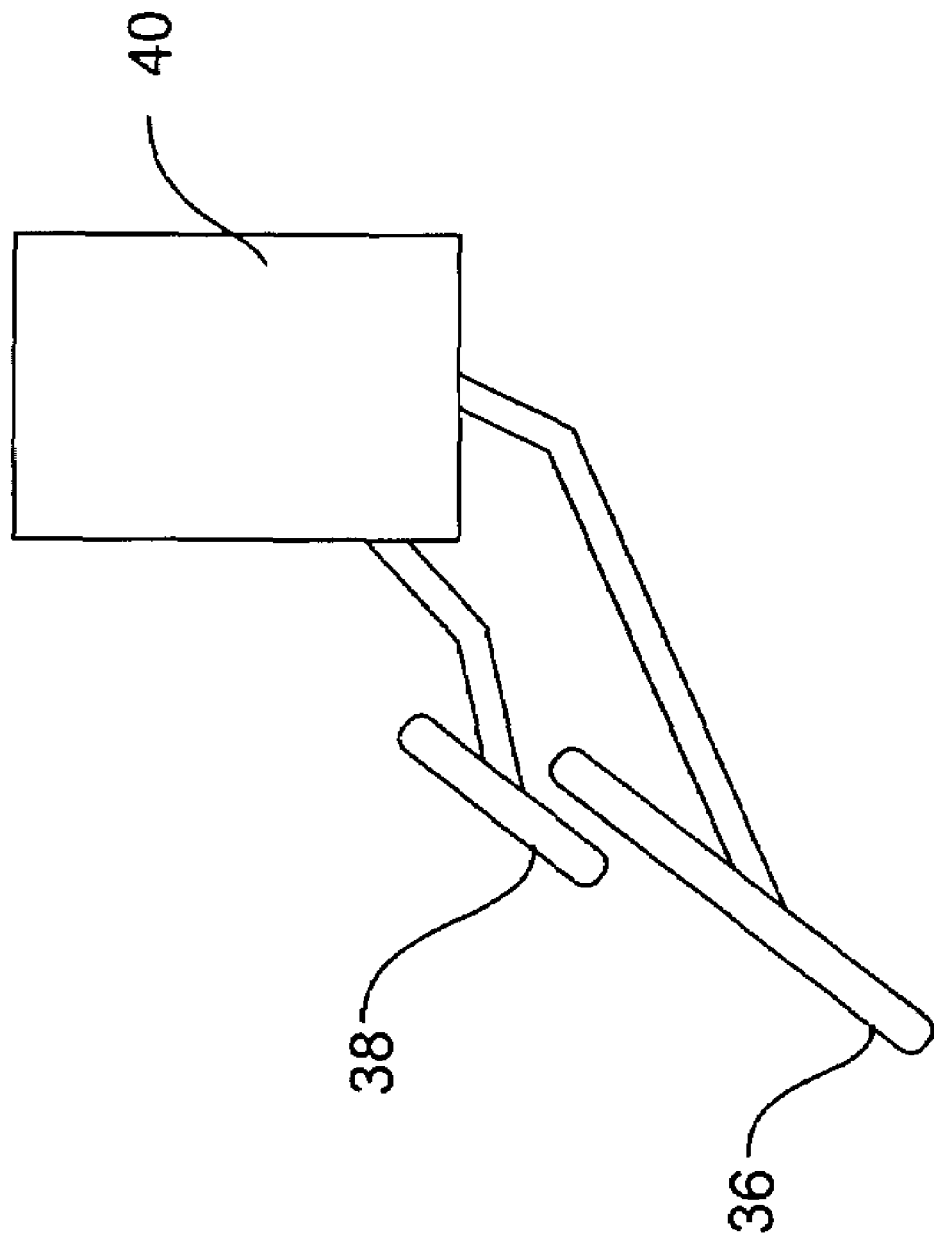

ERGONOMICALLY DESIGNED MAIL TRANSPORT AND DELIVERY VEHICLE

CROSS REFERENCE TO RELATED APPLICATION

This application claims priority to U.S. Provisional Application No. 60/550,260 filed Mar. 5, 2004, entitled "Vehicle Interior, Carrier Route, Right Hand Drive," the contents of which are incorporated by reference herein.

FIELD OF THE INVENTION

The present invention relates to an ergonomically designed motor vehicle disposed to safely transport and deliver mail while increasing the efficiency of the human operator and minimizing work-related injuries thereto.

BACKGROUND OF THE INVENTION

The U.S. Postal Service (USPS) utilizes a large fleet of vehicles in its operations. In the past, standard vehicles were purchased for use as delivery vans and their interior was remodeled to suit the needed functions of the delivery operation. However, this process has limitations and is not ideally suited for the delivery operation. The present vans have limited visibility for the driver who operates the vehicle from the right side. As a result, most vehicle accidents have occurred at the front left side bumpers.

In addition, if the interior of the vehicle is not designed specifically for the operations that occur inside the vehicle. The configuration of the interior can induce operator positions that are unnatural. Such positions may induce strain and result in discomfort and reduced efficiency or possibly even physical injury.

Moreover, as the USPS uses new technology and devices to improve the efficiency of mail delivery, such as GPS (global positioning satellite) receivers and locators, data scanning and data transmission devices, the number and type of operations that take place in the interior of the vehicle increase.

The invention disclosed herein configures certain interior and exterior features of the vehicle so that it is ergonomically efficient, driver friendly, accident preventive and safe. The combination of these features reduce driver-operator fatigue, injuries due to unnatural positions used by the operator within the vehicle, and allow the operator to perform their jobs at a higher level of efficiency than has been achieved previously with conventionally configured vehicles.

It is accordingly a primary object of the invention to provide a vehicle with a combination of features that make the vehicle's operation and use more compatible with the various body types, sizes, strengths of the diverse operators using such vehicles for mail transport and delivery.

This is achieved by making the vehicle controls (steering, brakes and throttle) that interface with the operator be able to be located in a position that is comfortable to the operator. In addition, the operator seat is of a size and shape that it is comfortable to the $5^{th}$ percentile female through the $95^{th}$ percentile male. The operator seat is also adjustable and the brake and throttle controls are adjustable with respect to the operator seat. Moreover, the seat is pivotable from a driving configuration facing ahead of the vehicle to a laterally facing position where mail operations can be comfortably conducted from the drivers seat. In addition, the door into the cargo compartment includes a window that lines up with a window in the left side of the cargo compartment such that visibility to the left of the vehicle is enhanced. In a preferred embodiment all the auxiliary system controls are within reach of the operator when the operator is in the operator seat.

The combination of such features provides an improved vehicle for the transport and delivery of mail in a more efficient manner with greater safety and operator comfort.

SUMMARY OF THE INVENTION

In accordance with the invention, there is provided a motor vehicle ergonomically suited for mail transport and delivery by a human operator. The vehicle has an operator control area located on the right side of the fore and aft centerline of the vehicle. The vehicle also includes a mail handling area located laterally from the operator control area, on the left side of the fore and aft centerline of the vehicle.

An operator seat is in the operator control area and the operator seat is comprised of a seat cushion and a seat back. The seat back is pivotable about a horizontal axis such that the angle between the seat back and the seat cushion can be selectively adjustable. The operator seat is also adjustable fore and aft and rotatable about a vertical axis from a first orientation facing the front of the vehicle to a position facing laterally toward the mail handling area. The operator seat is configured to be suitable for use by human operators in the range of from the $5^{th}$ percentile female through the $95^{th}$ percentile male. The operator seat also has a selective vertical adjustment and a selective fore and aft adjustment disposed to allow selective placement of the operator seat in a generally horizontal direction parallel to the centerline of the vehicle.

The vehicle also has vehicle controls including a steering wheel, an accelerator pedal and a brake pedal. The accelerator pedal and the brake pedal have a common mount, with the mount being capable of selective adjustment fore and aft. The steering wheel is mounted on a steering column capable of telescoping to adjust the horizontal distance between the operator and the steering wheel, and the steering column is capable of being selectively tilted the vertical direction.

The vehicle further includes a cargo area aft of both the operator control area and the mail handling area. The cargo area is defined by a forward bulkhead separating the cargo area from both the operator control area and the mail handling area. The forward bulkhead is comprised of a fixed portion aft of the operator control area and the mail handling area. The fixed portion has an aperture therethough aft of the mail handling area, and a sliding door for selectively opening and closing aperture. The cargo area is also defined by a left-side bulkhead, a right-side bulkhead, and a rear bulkhead, the rear bulkhead having a rear access door therethough. The upper forward portion of the left-side bulkhead has a window therethrough. The sliding door has a window therethrough with the window in the sliding door being in line of sight with the left-side bulkhead window and the operator seat such that the operator has an enhanced view through the left side of the vehicle when said sliding door is in the open or closed position.

As a result, the operator can comfortably and safely operate the vehicle as well as efficiently conduct mail sorting or collecting operations within the vehicle without discomfort or possible injury.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 8 is a schematic view of a mount for both the accelerator pedal and the brake pedal allowing both to be adjusted together.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
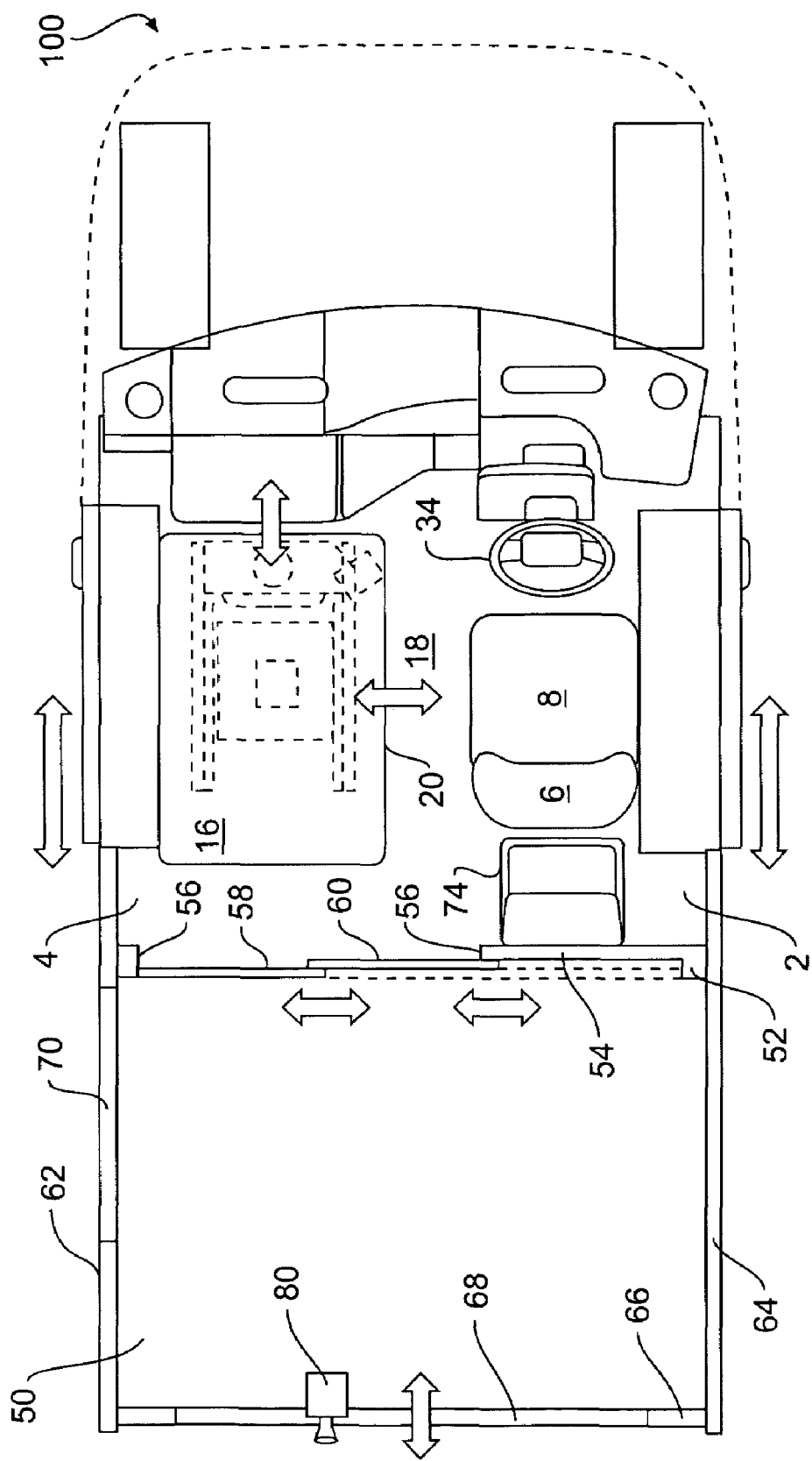
FIG. 1 is a schematic top plan view of one embodiment of the present invention.
Figure 2:
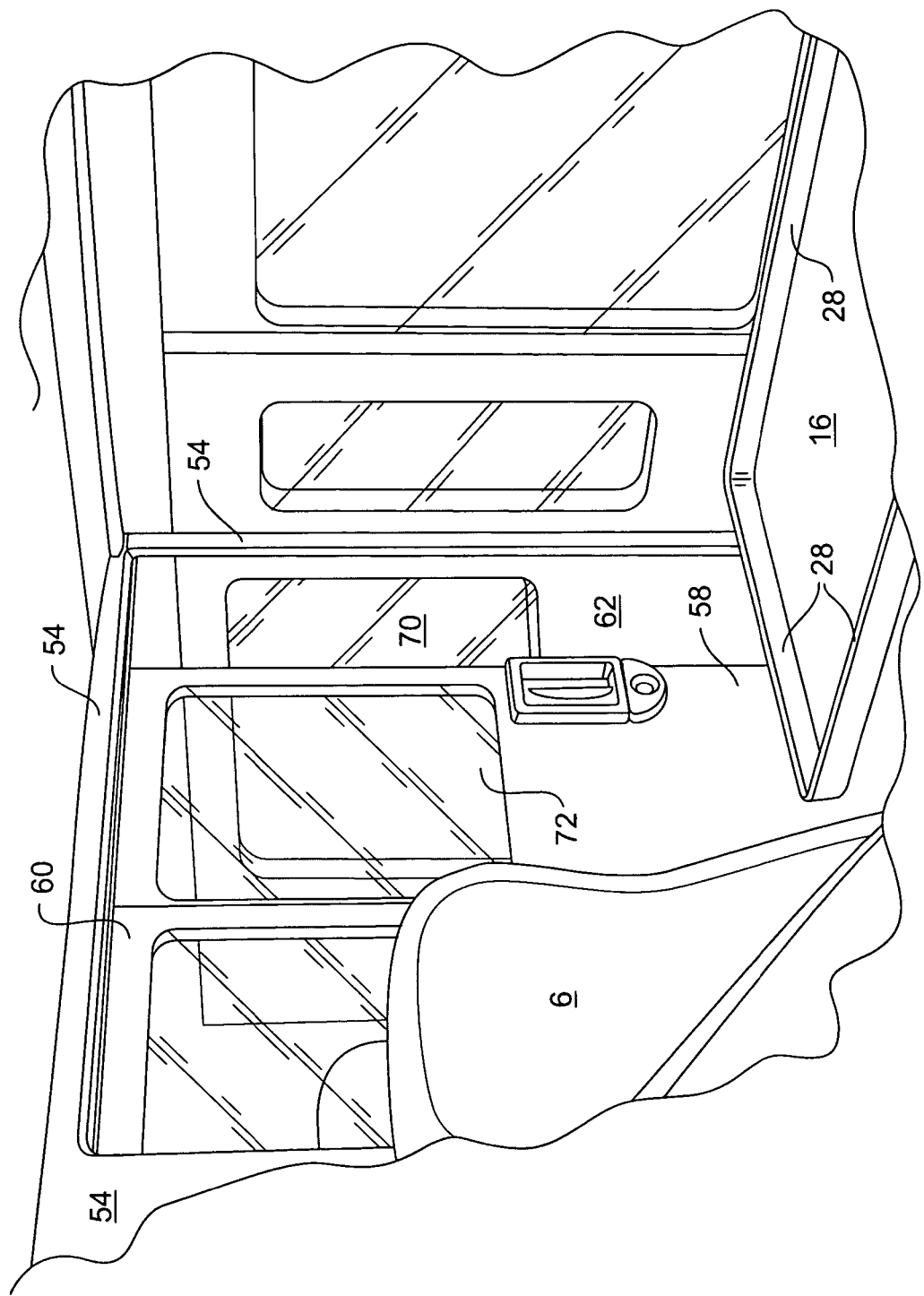
FIG. 2 is a cut-away portion of the vehicle cab illustrating the relationship of the windows providing enhance visibility to the left side of the vehicle.

In accordance with the invention there is provided a motor vehicle ergonomically suited for mail transport and delivery by a human operator. In accordance with the invention, there is an operator control area located in the vehicle on the right side of the fore and aft center line of the vehicle. As here embodied and most clearly depicted in FIG. 1, there is an operator control area 2 on the right-hand side of the vehicle 100. Right hand drive is utilized in such a vehicle to facilitate the deposit of mail from the vehicle into mail boxes adjacent the roadway on which the vehicle travels.

In accordance with the invention, there is an operator seat in the operator control area and as here embodied, the operator seat comprises a seat back 6, a seat cushion 8 and the seat back is pivotal about a horizontal axis such that the angle between the seat back 6 and the seat cushion 8 can be adjusted by the operator. As shown most clearly in FIG. 6, there is a seat back tilt control handle 10, which the operator uses to control the angle between the seat back and the seat cushion. In accordance with the invention, the operator seat is also adjustable in the fore and aft direction, as well as vertically to accommodate operators of various statures comfortably. As here embodied, and depicted in FIG. 1 the seat includes fore and aft control lever 12 and vertical adjustment control 14. As will be discussed in more detail below, many of the parameters associated with the seat are designed to accommodate operators of stature within a range that would encompass most operators.

Figure 5:
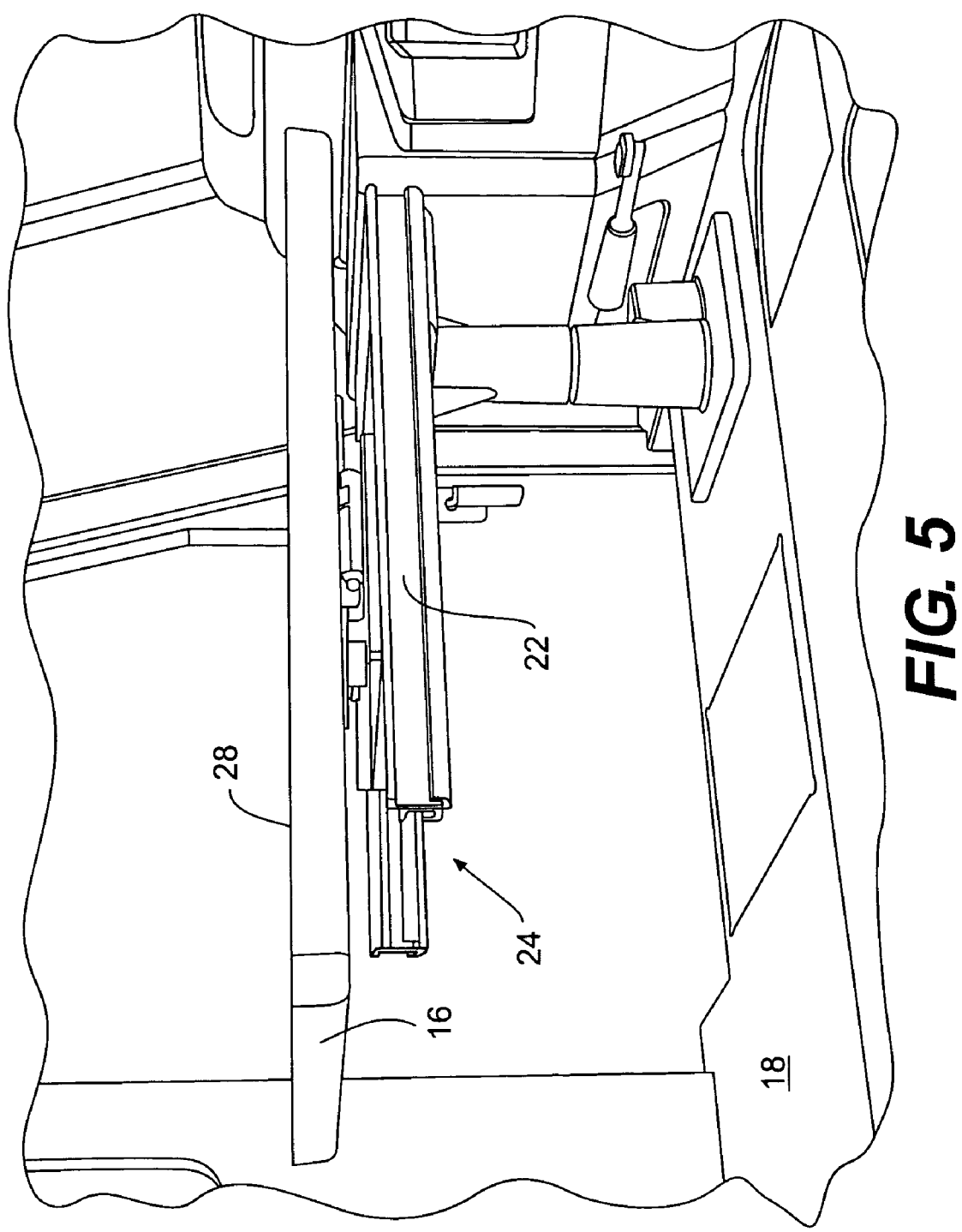
FIG. 5 is right-side view of the adjustable mail handling table in the vehicle cab.

In accordance with the invention, there is a mail handling area located laterally from the operator control area on the left side of the fore and aft center line of the vehicle. As is most clearly depicted in FIG. 1, the mail handling area 4 includes a removable tray 16 mounted to the floor of the vehicle 18. As here embodied and most clearly depicted in FIG. 1, the tray 16 has a right most edge 20 adjacent the operator seat and in a preferred construction, the tray is in a range of from 16.5 centimeters to 25.4 centimeters from the left edge of the operator seat when the operator seat is facing forward. As here embodied, the mail tray also includes an adjustment mechanism for moving the tray selectively in the fore and aft direction. As here embodied and depicted in FIG. 5, the tray 16 also includes an adjustment mechanism 22 allowing the tray 16 to be moved laterally toward and away from the operator of the vehicle. As is shown in the embodiment of FIG. 5, the tray is mounted to the floor 18 of the vehicle. In a preferred embodiment, the tray 16 can be detached and an auxiliary removable seat (not shown) can be placed in the mail sorting area 4 of the vehicle.

Figure 4:
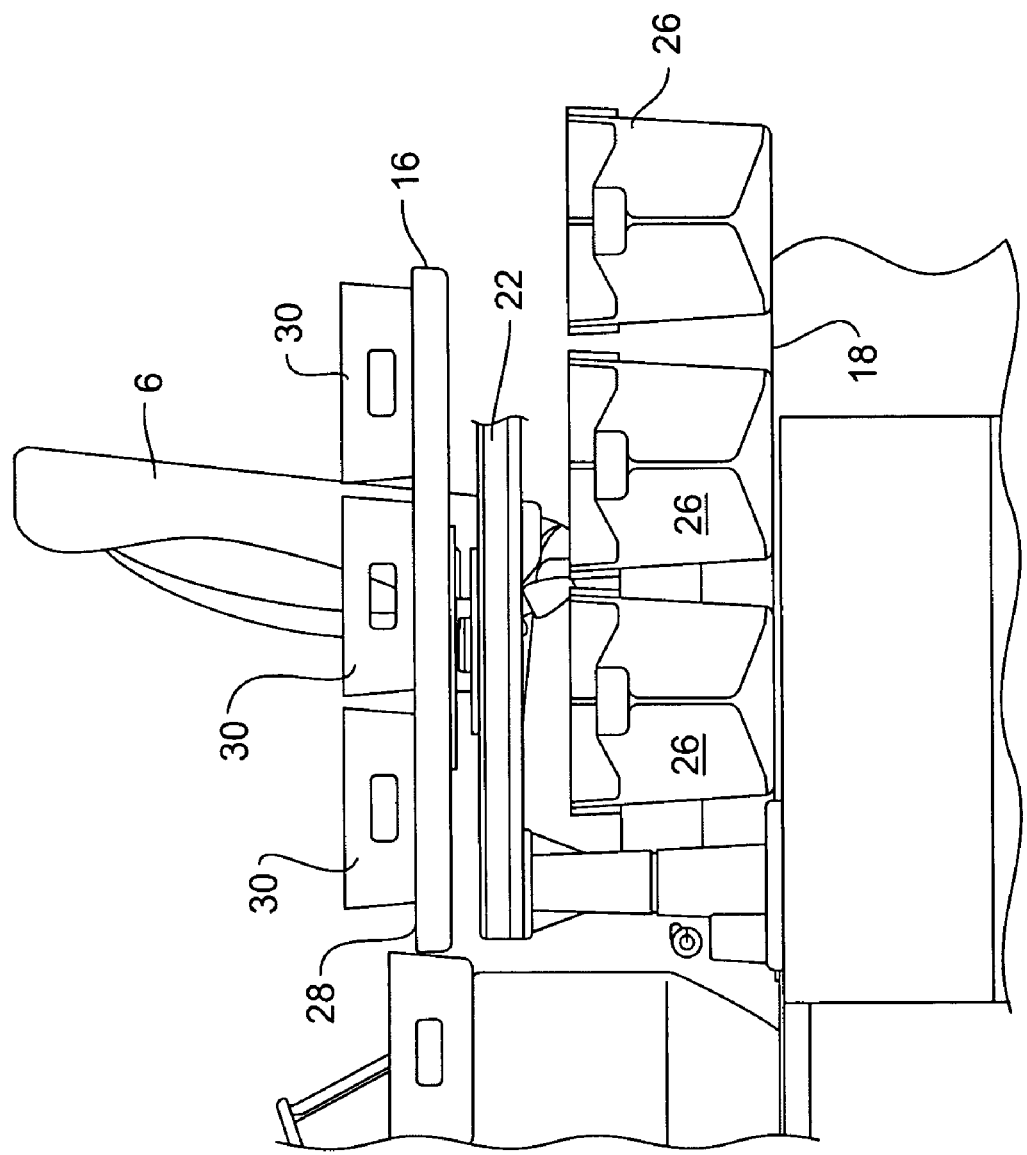
FIG. 4 is a cut-away view of the left side of the vehicle showing some of the components in the mail handling area.

In accordance with the invention, the operator seat is rotatable about a vertical axis from a first orientation facing the front of the vehicle to a position facing laterally toward the mail handling area. In such a configuration, the operator can comfortably perform mail sorting and mail handling operations at the mail handling tray without twisting in the operator seat to accomplish such operations. As is depicted in FIG. 4, the mail sorting tray assembly 24 is spaced sufficiently above the floor 18 of the vehicle such that standard size mail bins 26 can be placed beneath it. The mail sorting upper tray 16 includes a rim 28 designed to prevent trays 30 placed thereon shown in FIG. 4 from sliding off the mail handling tray 16 as a result of motion of the vehicle.

As here embodied, the tray assembly is a cantilever design or a four point mount design mail tray constructed of aluminum is provided immediately to the left of the driver. The top of the tray 16 may be 66.0 cm (26 inches) wide by 99.1 cm (39 inches) in length from front to rear, and may have a vertically flanged edge 5.1 cm (2.0 inches) high. The height of the tray may be at least 535.5 cm (14 inches) from floor to the underside of the tray 16.

In accordance with the invention, the operator seat is configured to be suitable for use by human operators in the range of from the fifth percentile female through the $95^{th}$ percentile male. Human weight and measurements for this design study and concept model were specific and calculated by UMTRI (University of Michigan Transportation Research Institute), and are shown in Table A below.

TABLE A

| Range of Height & Weight Measurements | | |
| --- | --- | --- |
| Dimension | Small Female | Large Male |
| Stature (cm) | 150.4 (5% ile) | 188.0 (95% ile) |
| Seated Height (cm) | 78.2 | 97.7 |
| Weight (kg) | 47.9 | 110.6 |

In accordance with the invention, the operator seat also has a selective vertical adjustment. This allows the distance between the seat cushion and the floor of the vehicle to be adjusted to accommodate operators of different statures. In accordance with the invention, the seat further includes a selective fore and aft adjustment disposed to allow selective placement of the operator seat in a generally horizontal direction parallel to the center line of the vehicle, again to accommodate operators of different statures. To accommodate operators ranging from a $5^{th}$ percentile female to a $95^{th}$ percentile male, the size of the components for the seat should preferably be within certain specific ranges. In defining the dimensions of the seat, the dimensions are given with respect to the "H-point."

The H-point is determined by an H-point machine which is a weighted manikin used to measure the H or "hip point" of a seat. The H-point is a standard reference point from which many vehicle interior dimensions are taken. The H-point is a more meaningful reference than points taken on the undeflected seat contour, because the weight of the manikin allows the compression of the seat to be taken into account when defining, for example, seat height. There are currently two SAE H-point manikins: the original manikin developed in the early 1960s and the HPM-II, developed in the late 1990s by the University of Michigan Transportation Research Institute (UMTRI. The measurements for the vehicle of the present invention were performed with both the original H-point machine and HPM-II. Benchmarking was conducted with the original H-point machine and the HPM-II was then used to validate a mockup. Measurements using the new tools are similar, although HPM-II provides a different measurement of lumbar support prominence. A reference point intrinsic to a seat, defined and measured using the H-point machine. The seat H-point is defined and measured with the seat set to the manufacturer's specified configuration, including seat back angle and seat cushion angle. The H-point travels with the seat as it is adjusted, so the fore-aft and vertical seat adjustment range is characterized by an H-point travel path. This the dimensions used herein are with reference to the H-point.

As here embodied, the seat cushion has an actual width at the H-point of no less than 500 millimeters, a clearance at the H-point of no less than 525 millimeters. A width at the front of the cushion of no less than 525 millimeters and the seat cushion projects toward the H-point less from the H-point forward less than 305 millimeters. In this embodiment, the seat back will have a width of 220 millimeters above the H-point of no less than 384 millimeters, a width 318 millimeters above the H-point of no less than 471 millimeters. In such an embodiment, the seat back include side bolsters shown in FIG. 6. The side bolsters in such an embodiment are no more than 288 millimeters above the H-point. In such an embodiment, the seat cushion preferably has an uncompressed front height of not more than 346 millimeters and a seat back height of not less than 800 millimeters.

Figure 6:
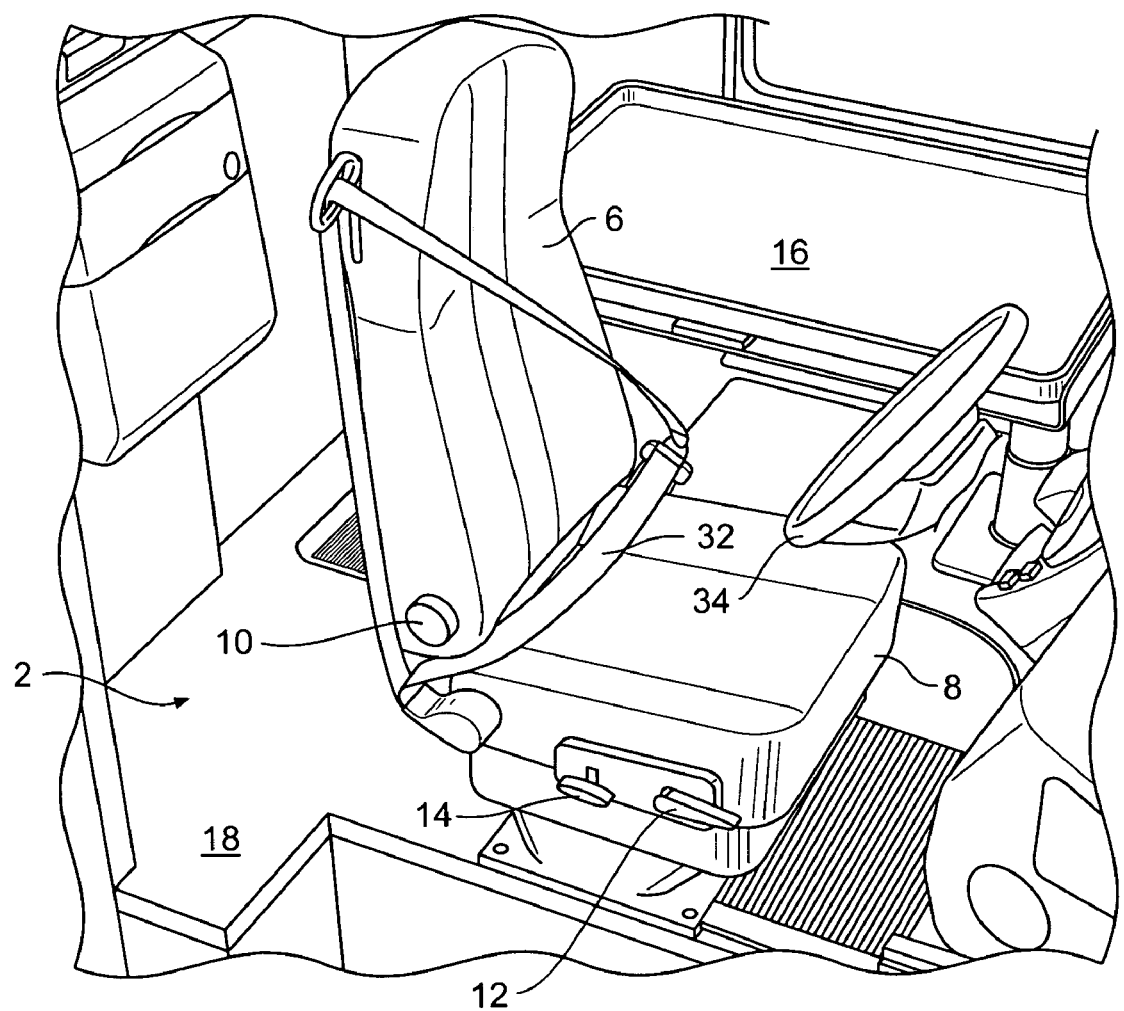
FIG. 6 is a right-side view of the operator area illustrating some of the features of the vehicle controls and the seat.

As shown in FIG. 6, the vehicle further includes standard safety features such as a 3-point seat belt 32. In accordance with the invention, the vehicle also includes vehicle controls including a steering wheel 34, an accelerator pedal 36, and a brake pedal 38. In a preferred embodiment, the accelerator and brake pedal have a common mount 40 such that the mount is capable of selected adjustment in the fore and aft direction. As here embodied and most clearly depicted in FIG. 8, the brake pedal 38 and accelerator pedal 36 are affixed to mount 40 capable of being selectively adjusted in the fore and aft direction. This feature in combination with the fore and aft adjustment of the operator seat provides maximum adjustability for the comfort of the driver with respect to the driver's relationship with the operating controls that are operated with the operator's feet.

In accordance with the invention, the vehicle includes a steering wheel mounted on a steering column capable of telescoping to adjust the horizontal distance between the operator and the steering wheel. As here embodied and most clearly depicted in FIG. 5, the steering wheel 34 is mounted on steering column 42 and it is adjustable in the fore and aft direction to accommodate operators of different statures. In accordance with the invention, the steering wheel is also capable of being selectively tilted in the vertical direction. As here embodied, the instrument pod 43 is affixed to the steering column 42 such that movement of the steering column 42, either fore and aft and/or in a pivoting direction, also moves the instrument pod 43 such that the instruments therein remain in the correct relationship to the operator, irrespective of adjustments of the steering column 42 or the stature of the operator. Thus, all the components that interface with the operator or that the operator uses for the basic control of the vehicle, such as the steering wheel, the brake, and the accelerator are adjustable with respect to the seat such that the configuration of these controls can be optimized for operators of different statures.

Figure 7:
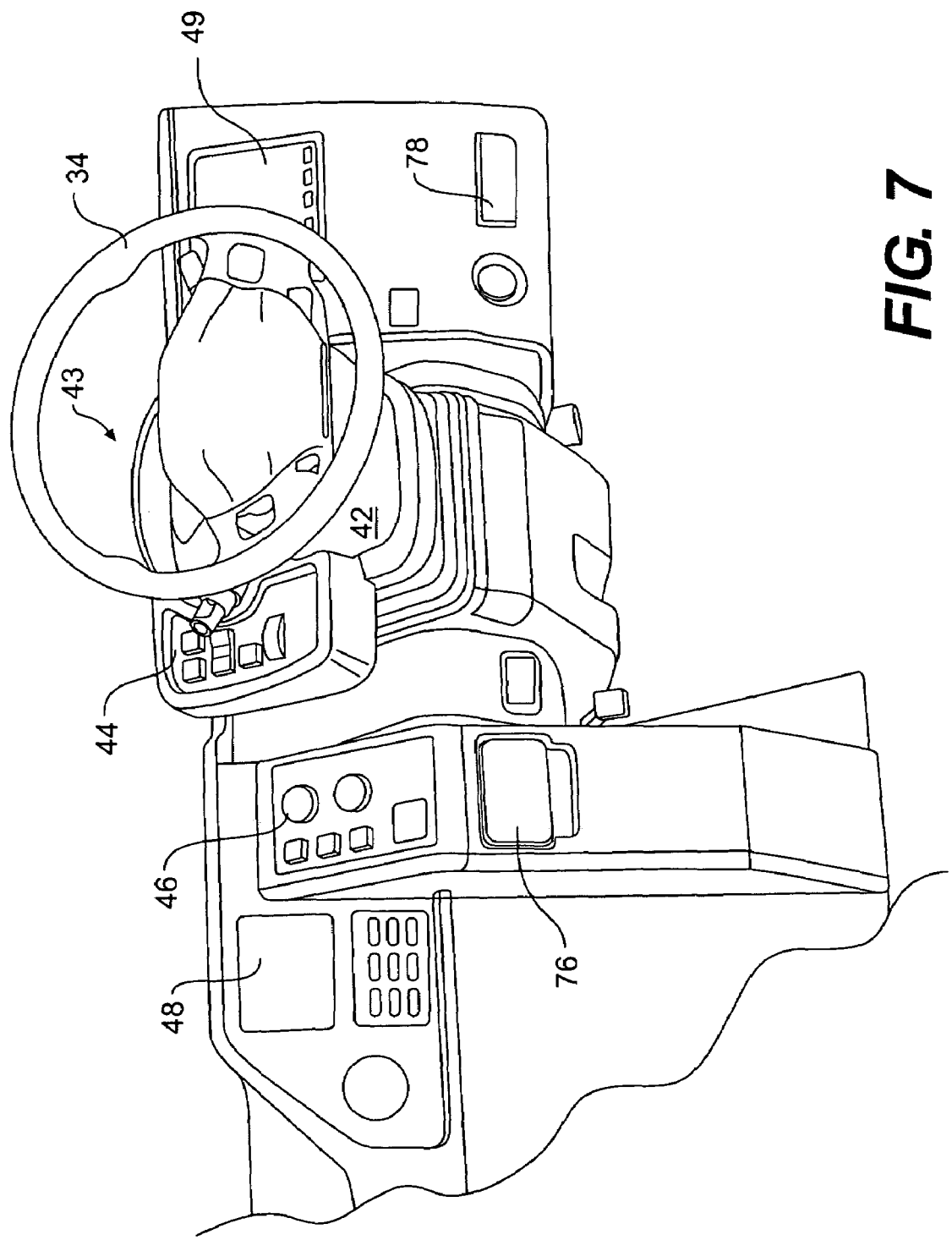
FIG. 7 is a schematic view of the vehicle controls and associated portions of the vehicle.

As here embodied and depicted schematically in FIG. 7, the operator controls 44 and 46 for auxiliary component systems such as a vehicle heater, vehicle turn signals, vehicle ignition switch, at least one power window control, power door locks, windshield wipers, heater fan and controls and auxiliary systems for displaying information such as a GPS locator system (not shown) and a communication system 48 are all readily available to the operator in the vehicle.

Figure 3:
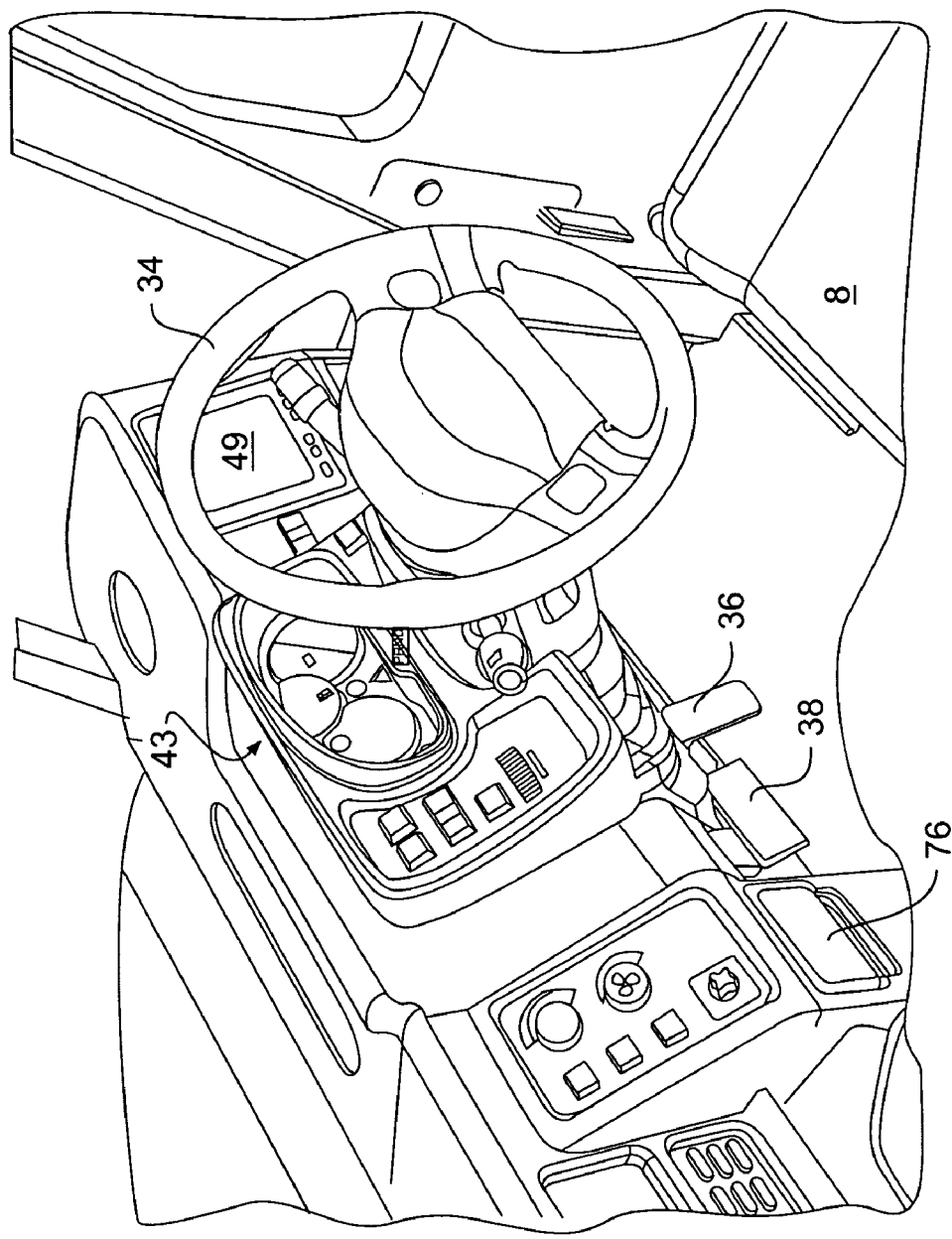
FIG. 3 is a left-side schematic view of the vehicle controls.

As here embodied and depicted in FIG. 7 and FIG. 3, the instruments and vehicle controls can be easily accessed by the operator without undue contortions from the normal seating position within the operator seat.

In accordance with the invention, there is provided a cargo area aft of both the operator control area and the mail handling area. As here embodied and most clearly depicted in FIG. 1, the cargo area 50 is defined by a forward bulkhead 52 separating the cargo area 50 from both the operator control area 2 and the mail handling area 4, a left side bulkhead 62, a right side bulkhead 64, and a rear bulkhead 66. The forward bulkhead 52 is comprised of a fixed portion 54 aft of the operator control area 2 and the mail handling area 4. While the fixed portion 54 is fixed with respect to the vehicle during operation of the vehicle, it can be attached to the interior of the vehicle in different locations fore and aft within the vehicle. Thus, an operator who wants to store more cargo forward of the forward bulkhead 52 can move it aft and affix it to the vehicle. Similarly, if the size of the rear cargo area 50 is to be increased, the forward bulkhead can be moved forward and affixed to the interior of the vehicle. The fixed portion 54 of the forward bulkhead 52 has an aperture 56 therethrough aft of the mail handling area 4. The aperture 56 is selectively opened and closed by at least one sliding door covering the aperture. As here embodied, the vehicle 100 includes two sliding doors, a left sliding door 58 and a central siding door 60. As here embodied, the upper forward portion of the left side bulkhead 62 has a window 70 therethrough.

In accordance with the invention, the vehicle includes a window in the sliding door in line of sight with the left-side bulkhead window and the operator seat such that the operator has an enhanced view through the left side of the vehicle when said sliding door is in the open or closed position. As here embodied, the left sliding door 58 has a window 72, with the window 72 in the sliding door 58 being in line of sight with the left side bulkhead window 70 and the operator seat such that the operator has an enhanced view through the left side of the vehicle when the sliding door 58 is in the open or closed position. The rear bulkhead has rear access therethrough by means of a rear cargo door 68.

While the aperture 56 through the forward bulkhead 54 is of sufficient size that there is access to the cargo area 50 from the operator control area 2 and the mail handling area 4, the aperture is not designed to allow the operator to pass therethrough. Studies have shown that the contortions necessary for operators to enter the cargo area through this door may cause injury to the operator. In a preferred embodiment, the vehicle includes means within the vehicle for discouraging the operating from entering the cargo area through the aperture in the forward bulkhead. These means can include something as simple as a sign over the bulkhead aperture warning the operator not to pass through the aperture into the cargo area.

The operator of the vehicle may also rotate the operator seat 90° to the left in order to perform mail handling operations at the mail handling tray 16. Rotation of the seat also reduces the contortions of the operator that may cause injury.

There may also be provided a storage device detachably affixed to the forward bulkhead behind the operator seat when the operator seat is faced forward. As here embodied a storage device 74 is affixed to the bulkhead 54. When the operator seat is turned 90° to face the mail handling area, the operator can readily access the storage device 74 which may contain materials necessary for mail handling and delivering operations. Preferably, such a device is a storage device in which blank forms can be stored for use by the operator. With the form storage device being placed on the rear bulkhead, it is within easy reach of the operator when the operator is in the operator's seat and the operator's seat is rotated to face the mail handling area 4.

A number of systems have been developed for placing information on mail that can be read with hand held scanning devices. As here embodied, the vehicle includes a storage receptacle 76 for temporarily storing a hand held scanning device (not shown). The receptacle 76 is located such that the hand held scanning device in the receptacle is within easy reach of the operator when the operator is in the operator seat and the operator seat is facing forward. As here embodied and most clearly depicted in FIG. 7, the receptacle 76 for the hand held scanner is within the center console beneath auxiliary system controls.

The vehicle may also contain a lock system for securing the vehicle that includes a portable lock controlling transmitter (not shown) disposed to lock the doors of the vehicle. The vehicle itself includes a receptacle 78 for the convenient storage of such a device as shown in FIG. 7.

The vehicle may also include a video camera disposed to view the rear of the vehicle with a video display visible to the operator when the operator is in the operator seat and the operator seat is facing forward. As here embodied and most clearly depicted in FIG. 3, the dashboard includes a display 49 for such a device. A front vision camera may be provided which ties into the rear vision monitor system. The front camera (not shown) provides a view of the entire front bumper to an area at least 9 ft in front the front bumper. A two-channel video display (such as display 49) may be provided and located such that its view is unobstructed for the seated and restrained $5^{th}$ percentile female through $95^{th}$ percentile male, without obstructing forward or lateral visibility, or obstructing access or visibility of other instruments and controls. The mounting may be adjustable to minimize neck bending (forwards or backwards) for the $5^{th}$ percentile female and $95^{th}$ percentile male. The system may provide a selector to toggle the channel between front and rear view cameras. Preferably, the video camera 80 on the rear of the vehicle 100 is activated and displays a view to the rear of the vehicle when the vehicle is shifted into reverse gear.

The vehicle may also include a ground positioning satellite GPS system (not shown) that can display maps and the current location of the vehicle. The display should also visible from the operator position.

By making the components of the vehicle that interface with the driver be adjustable such that operators of different statures can readily conform the vehicle controls to a comfortable driving position, and having provided a seat that is adjustable and of a size that is appropriate for operators from the $5^{th}$ percentile female operator to the $95^{th}$ percentile male operator, in combination with mail handling capabilities that are readily accessible to the operator when the operator seat is rotated about a vertical axis to toward the mail handling area and providing enhanced visibility of the operator to the left side of the vehicle through the windows provided therein, in combination with the rear facing camera, there is provided a vehicle uniquely suited for an operator to comfortably, efficiently, and safely operate in the specialized environment of transportation and delivery of mail.

The vehicle of the present invention includes features for a mail transport and delivery vehicle which is ergonomically designed for the operator's safety and efficient operation of the vehicle. Other embodiments consistent with the present invention will be apparent to those skilled in the art from consideration of the specification and practice of the invention disclosed herein. It is intended that the specification and description be considered exemplary only, with the true scope of the invention being indicated by the following claims and equivalents.

What is claimed is:

1. A motor vehicle ergonomically suited for mail transport and delivery by a human operator, said vehicle comprising:

an operator control area located on the right side of the fore and aft centerline of said vehicle;

a mail handling area located laterally from said operator control area, on the left side of the fore and aft centerline of said vehicle;

an operator seat in said operator control area comprised of a seat cushion and a seat back, said seat back being pivotable about a horizontal axis such that the angle between said seat back and said seat cushion can be selectively adjustable, said operator seat being adjustable fore and aft, said operator seat being rotatable about a vertical axis from a first orientation facing the front of said vehicle to a position facing laterally toward said mail handling area, said operator seat being configured to be suitable for use by human operators in the range of from the $5^{th}$ percentile female through the $95^{th}$ percentile male, said operator seat having a selective vertical adjustment, a selective fore and aft adjustment disposed to allow selective placement of said operator seat in a generally horizontal direction parallel to said centerline of said vehicle;

vehicle controls including a steering wheel, an accelerator pedal and a brake pedal, said accelerator and a brake pedals having a common mount, said mount being capable of selective adjustment fore and aft, said steering wheel being mounted on a steering column capable of telescoping to adjust the horizontal distance between the operator and the steering wheel, said steering column being capable of being selectively tilted the vertical direction; and a cargo area aft of both said operator control area and said mail handling area, said cargo area being defined by a forward bulkhead separating said cargo area from both said operator control area and said mail handling area, said forward bulkhead being comprised of a fixed portion aft of said operator control area and said mail handling area, said fixed portion having an aperture therethough aft of said mail handling area, and a sliding door for selectively opening and closing said aperture, said cargo area also being defined by a left-side bulkhead, a right-side bulkhead, and a rear bulkhead, said rear bulkhead having a rear access door therethough, the upper forward portion of said left-side bulkhead having a window therethrough, said sliding door having a window therethrough, said window in said sliding door being in line of sight with said left-side bulkhead window and said operator seat such that said operator has an enhanced view through the left side of said vehicle when said sliding door is in the open or closed position.

2. The vehicle of claim 1 wherein seat cushion has an actual width at the H-point of no less than 500 mm, a clearance at the H-point of no less than 525 mm, a width at the front of the cushion of no less than 525 mm, and said seat cushion projects forward of the H-point less than 305 mm.

3. The vehicle of claim 2 wherein seat back has a width 220 mm above the H-point of no less than 384 mm, a width 318 mm above the H-point of no less than 471 mm.

4. The vehicle of claim 3 wherein said seat back includes side bolsters, said side bolsters being no more than 288 mm above the H-point.

5. The vehicle of claim 2 wherein said seat back has a height of not less than 800 mm.

6. The vehicle of claim 2 wherein said seat cushion has an uncompressed front height of not more than 346 mm.

7. The vehicle of claim 1 wherein said mail handling area includes a removable mail sorting tray with the right-most edge of said tray being in the range of from 16.5 cm to 25.4 cm from the left edge of said operator seat when said operator seat is facing forward.

8. The vehicle of claim 7 wherein said mail sorting tray includes an adjustment mechanism for moving said mail tray selectively fore and aft.

9. The vehicle of claim 1 wherein said mail handling area includes a removable seat.

10. The vehicle of claim 1 including means within said vehicle for discouraging said operator from entering said cargo area through said aperture in said forward bulkhead.

11. The vehicle of claim 1 including auxiliary component systems having component controls for controlling the function of said auxiliary component systems, said component controls being placed within reach of said operator when said operator is in said operator seat and said operator seat is facing forward.

12. The vehicle of claim 11 wherein said auxiliary component systems include: a vehicle heater, vehicle turn signals, a vehicle ignition switch, at least one power window control, power door locks, windshield wipers, heater fan controls, a GPS locator system, and a communication system.

13. The vehicle of claim 1 including a removable form storage device detachably mounted on said forward bulkhead behind said operator seat when said operator seat is facing forward.

14. The vehicle of claim 13, said removable form storage device being placed within reach of said operator when said operator is in said operator seat and said operator seat is rotated to face said mail handling area.

15. The vehicle of claim 1 including a receptacle for temporarily storing a hand-held scanning device, said receptacle being located such that said handheld scanning device in said receptacle is within reach of said operator when said operator is in said operator seat and said operator seat is facing forward.

16. The vehicle of claim 1 including a lock system that includes a portable lock controlling transmitter, said lock system being disposed to lock the doors of said vehicle.

17. The vehicle of claim 1 including a video camera disposed to view to the rear of said vehicle, a display visible to said operator when said operator is in said operator seat and said operator seat is facing forward.

18. The vehicle of claim 17, wherein said video camera is activated and the view to the rear of said vehicle is displayed when said vehicle is shifted into reverse.

19. The vehicle of claim 1 including an instrument pod mounted on said steering column such that adjustment of said steering column, either fore and aft or pivotally, maintains the same special relationship of said instrument pod with said steering wheel.

20. The vehicle of claim 1, said forward bulkhead being detachably affixed to said vehicle such that the size of said cargo area can be changed by moving said forward bulkhead to different locations fore and aft inside said vehicle.

* * * * *

UNITED STATES PATENT AND TRADEMARK OFFICE
CERTIFICATE OF CORRECTION

PATENT NO. : 7,159,915 B2  Page 1 of 1
APPLICATION NO. : 10/952845
DATED : January 9, 2007
INVENTOR(S) : Wayne Corey et al.

It is certified that error appears in the above-identified patent and that said Letters Patent is hereby corrected as shown below:

In Claim 1, Column 8, Line 58, "and a brake" should read --and brake--.

In Claim 1, Column 9, Line 6, "therethough" should read --therethrough--.

In Claim 1, Column 9, Line 10, "therethough" should read --therethrough--.

In Claim 15, Column 10, Line 22, "hand-held" should read --handheld--.

Signed and Sealed this

Twenty-second Day of May, 2007

JON W. DUDAS
*Director of the United States Patent and Trademark Office*